H. T. BECKWITH & W. PHILLIPS.
STRAW SPREADER.
APPLICATION FILED JUNE 11, 1913.
1,096,011.
Patented May 12, 1914.
2 SHEETS—SHEET 1.
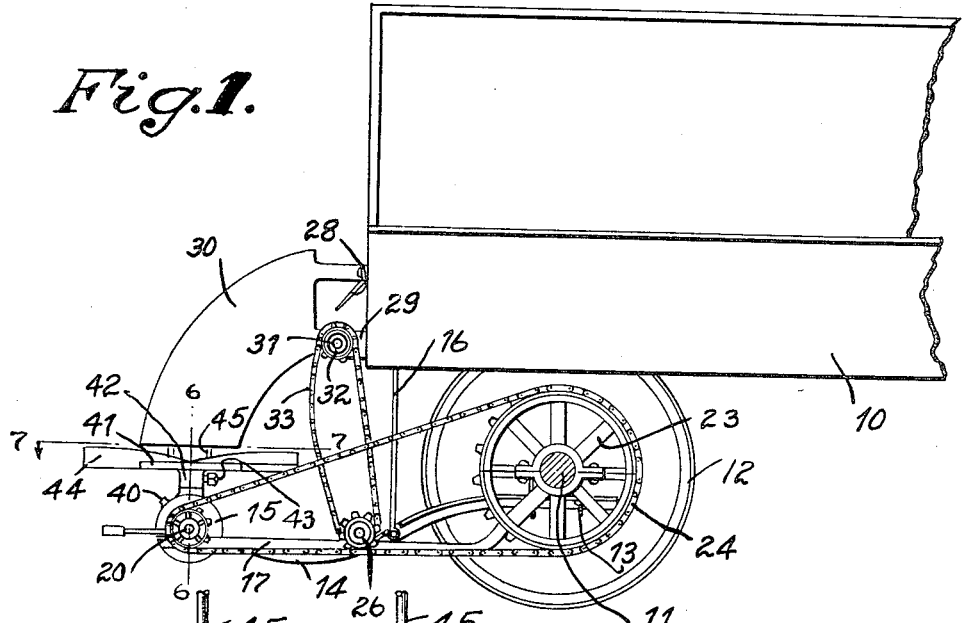
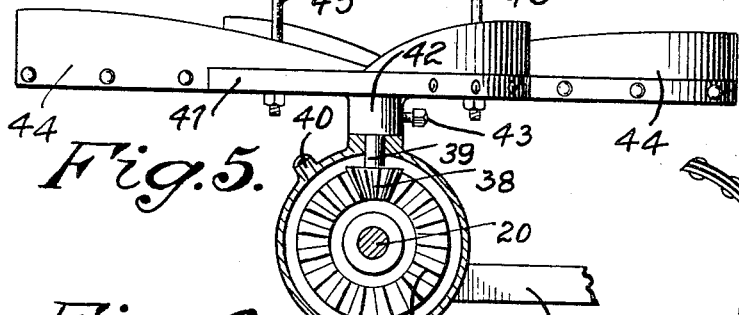
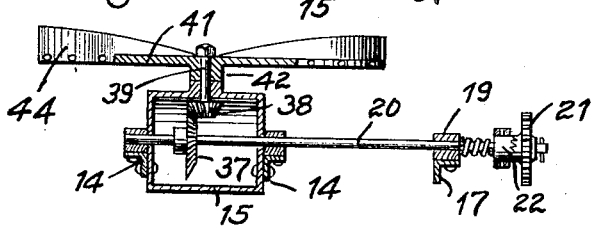
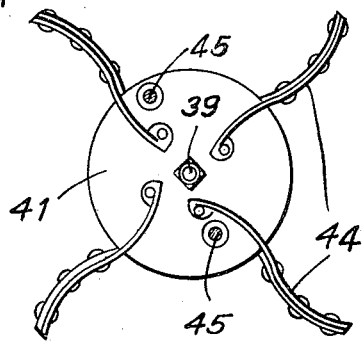
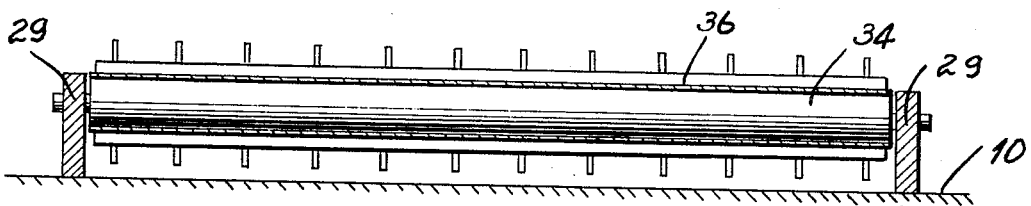
Witnesses
M. S. Watson
Harry M. Test
Inventors
H. T. Beckwith
W. Phillips
By Chandler Chandler
Attorneys

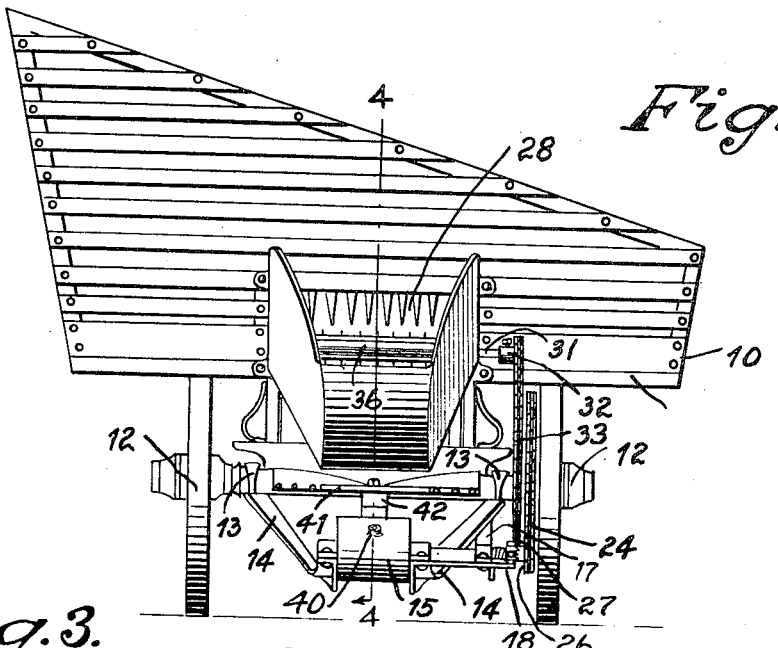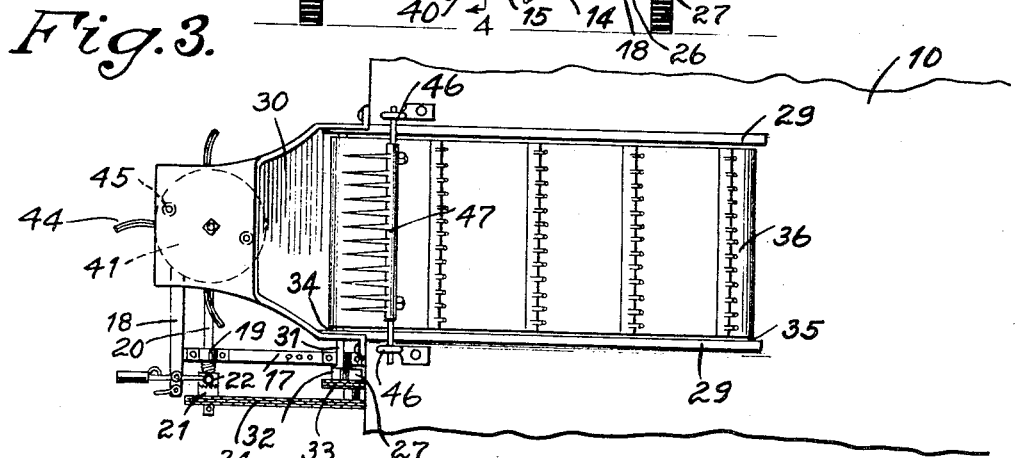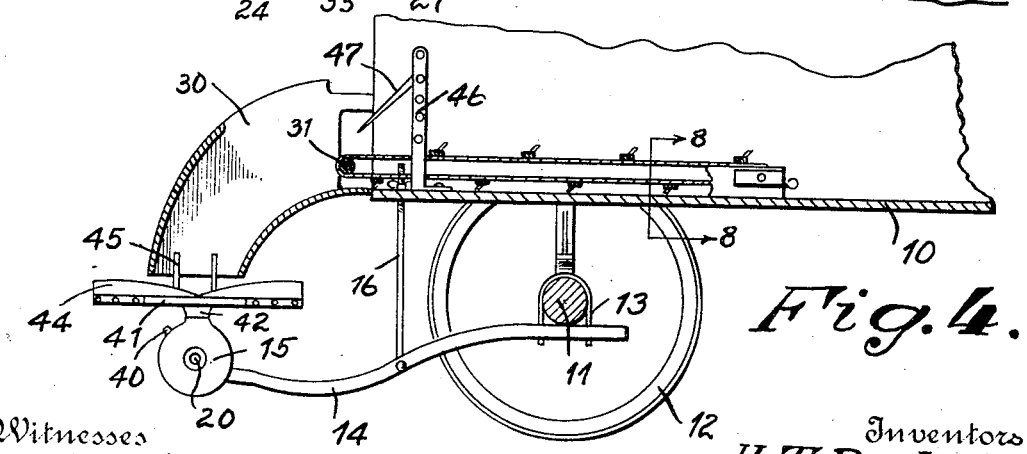

UNITED STATES PATENT OFFICE.

HARRIS T. BECKWITH AND WILLIAM PHILLIPS, OF BELPRE, KANSAS.

STRAW-SPREADER.

1,096,011.  Specification of Letters Patent.  Patented May 12, 1914.

Application filed June 11, 1913. Serial No. 773,100.

*To all whom it may concern:*

Be it known that we, HARRIS T. BECKWITH and WILLIAM PHILLIPS, citizens of the United States, residing at Belpre, in the county of Edwards, State of Kansas, have invented certain new and useful Improvements in Straw-Spreaders; and we do hereby declare the following to be a full, clear, and exact description of the invention, such as will enable others skilled in the art to which it appertains to make and use the same.

This invention relates to improvements in distributing devices and particularly to devices for scattering and distributing straw and similar material.

The principal object of the invention is to provide a novel device of this character, and of such construction and arrangement that straw may be rapidly and uniformly scattered with a minimum amount of time and labor.

Other objects and advantages will be apparent from the following description when taken in connection with the accompanying drawings.

In the drawings: Figure 1 is a side elevation of the wagon which contains the straw, showing our device applied thereto. Fig. 2 is a rear elevation of the wagon and scattering device. Fig. 3 is a top plan view. Fig. 4 is a vertical longitudinal sectional view on the line 4—4 of Fig. 2. Fig. 5 is an enlarged detail of the scattering means. Fig. 6 is a vertical transverse sectional view on the line 6—6 of Fig. 1. Fig. 7 is a horizontal sectional view on the line 7—7 of Fig. 1. Fig. 8 is an enlarged cross section on the line 8—8 of Fig. 3.

Referring particularly to the accompanying drawings, 10 represents the body of the wagon, 11 the rear axle and 12 the rear wheels thereof. Secured to the rear axle by means of the U-bolts 13 are the rearwardly extending converging arms 14, the outer ends of which carry a boxing 15, the purpose and construction of which will be referred to later. Connected to each of the arms 14 is a vertical threaded rod 16, each of which extends through the bottom of the wagon body to adjust the device to the proper height. Extending directly from the rear of the axle and connected to one of the arms 14 at its inner end is a bar 17, the outer end being supported in a laterally extending arm 18 carried by the adjacent arm 14. Extending in parallel relation with the arm 18 and journaled respectively, in the boxing 15 and in the journal bearing 19 carried by the arm 17, is a shaft 20. Loosely mounted on the outer end of the shaft 20 is a sprocket wheel 21; this sprocket being adapted to be clutched to the shaft 20 by the spring pressed clutch sleeve 22 keyed on said shaft. Bolted to one of the wheels 12 is a large sprocket 23 and trained around this sprocket and the sprocket 21 is a drive chain 24. Carried on the side of the bar 17 is an adjustable bearing 25, which carries a shaft provided with a sprocket 26 which engages with the chain 24 and a smaller sprocket 27 inwardly of the said sprocket 26.

In the rear end of the wagon body 10 is an opening 28, and extending from this opening is a chute or conveyer platform 29, the outer end emptying into the upper end of a hopper or chute 20. In the outer end of the conveyer platform 29 is a transverse shaft 31, one end of which is provided with a sprocket 32 disposed directly over the beforementioned sprocket 27. A chain 33 is trained around these sprockets 27 and 32. At the inner end of the conveyer platform is an adjustable belt roller 35, a similar roller 34 being carried by the shaft 31, and a conveyer belt 36 trained around these rollers. The power from the sprockets 23 is transmitted through the sprockets 26 and 27 to the conveyer 36 by means of the chain 33.

On the shaft 20 within the boxing 15 is a beveled pinion 37, this pinion meshing with a smaller pinion 38 carried by a vertical shaft 39 mounted in the boxing and extending vertically through the upper side thereof. This boxing has an opening 40 through which oil is to be poured to fill the boxing, the pinions thus working in an oil bath whereby they are thoroughly lubricated. A rotary platform 41 is provided on its lower side with a depending apertured base 42. This base carries a set screw 43 for clamping the same onto the upper end of the shaft 39. The rotating platform carries a plurality of radially disposed curved distributing arms 44, and adjacent the inner ends of said rolls are mounted the vertical agitating fingers 45. The lower end of the chute or hoppers 30 is disposed over this platform in such position that the fingers 45 extend up thereinto, the upper end of the chute being open to receive the straw which is carried from the wagon body to the chute.

From the foregoing, it will be understood that when the wagon is in motion, the sprockets 23 will drive the conveyer 36 and pass the straw into the upper end of the chute 30, at the same time that the shaft 20 will rotate the platform 41 which carries the distributing arms 44. The straw deposited in the upper end of the chute 30 falls down to the platform 41, and by the rotation of this platform, the fingers 45 will completely agitate the straw and prevent the same packing. As the straw is loosened, it falls onto the platform and is thrown or scattered by the centrifugal action of the distributing arms 44. Mounted on the conveyer platform adjacent the upper end of the chute 30 are the vertical arms 46, these arms being adjustably mounted on the said platform and carrying on their upper ends a fork 47 for retarding the flow of the straw to the chute.

Attention is directed to the fact that this device can be quickly and easily applied to any farm wagon, the principal addition to the wagon being the sprocket wheel 23, and of course the clamps for holding the device to the wagon. The device is comparatively simple in construction, and is efficient in operation.

What is claimed is:

1. In a feeding and distributing device for attachment to a farm wagon, a suitably supported rotary platform, an endless conveyer, a curved chute connected to the conveyer and extending over the rotary platform, means for simultaneously driving the conveyer and the rotary platform, scattering fingers carried by the platform, and agitating members carried by the platform and projecting into the said chute.

2. A scattering and distributing device for attachment to a farm wagon, comprising an endless conveyer, an arcuate chute disposed at one end of the conveyer, a gear boxing suitably supported below the chute, a rotary platform mounted between the boxing and the chute, gearing in the boxing for driving the platform, vertical rods carried by the platform and projecting upwardly into the lower end of the chute, and curved radially extending fingers carried by the rotary platform for scattering the material deposited from the chute.

In testimony whereof, we affix our signatures in the presence of two witnesses.

HARRIS T. BECKWITH.
WILLIAM PHILLIPS.

Witnesses:
W. L. BORST,
RALPH M. RUDD.